US012686387B2

(12) United States Patent
Kim

(10) Patent No.: US 12,686,387 B2
(45) Date of Patent: Jul. 21, 2026

(54) VEHICLE CONTROL METHOD AND DEVICE

(71) Applicant: HL Klemove Corp., Incheon (KR)

(72) Inventor: Jae Hwan Kim, Incheon (KR)

(73) Assignee: HL Klemove Corp., Incheon (KR)

( * ) Notice: Subject to any disclaimer, the term of this patent is extended or adjusted under 35 U.S.C. 154(b) by 152 days.

(21) Appl. No.: 18/745,070

(22) Filed: Jun. 17, 2024

(65) Prior Publication Data

US 2025/0313198 A1      Oct. 9, 2025

(30) Foreign Application Priority Data

Apr. 3, 2024    (KR) ........................ 10-2024-0045305

(51) Int. Cl.
*B60W 30/14*        (2006.01)
*B60W 30/16*        (2020.01)
(Continued)

(52) U.S. Cl.
CPC .......... *B60W 30/143* (2013.01); *B60W 30/16* (2013.01); *B60W 30/18009* (2013.01);
(Continued)

(58) Field of Classification Search
CPC ............. B60W 30/08; B60W 30/0953; B60W 30/0956; B60W 30/18009
See application file for complete search history.

(56) References Cited

U.S. PATENT DOCUMENTS 11,597,388 B2 *   3/2023   Wang ................ B60W 30/0953
2013/0151058 A1   6/2013   Zagorski et al.
(Continued)

FOREIGN PATENT DOCUMENTS

DE      10 2012 222 301 A1     6/2013
JP           2017-146653 A      8/2017
(Continued)

OTHER PUBLICATIONS

Office Action issued in DE 10 2024 115 031.9; mailed by the German Patent and Trademark Office on Dec. 17, 2024.
(Continued)

*Primary Examiner* — Anshul Sood
(74) *Attorney, Agent, or Firm* — Studebaker Brackett PLLC

(57)        ABSTRACT

The present embodiments relate to a vehicle control technology for controlling the behavior of a vehicle by determining whether to yield to a merging vehicle and provide a vehicle control device and method comprising a target selector determining a presence of a pocket lane using precise map information, and selecting a target vehicle driving in the pocket lane, a target information producer producing information about the target vehicle and distance information about a merging section, a yield determiner determining whether to yield to the target vehicle using a payoff matrix produced based on an acceleration variation of the host vehicle and information about a time required for the target vehicle to enter a driving lane where a host vehicle is driving, and a control signal generator generating a control signal for controlling a behavior of the host vehicle based on a result of determining whether to yield.

20 Claims, 12 Drawing Sheets host vehicle decelerates to comfort deceleration
$(b_{comfort})$ host vehicle decelerates to comfort deceleration
$(b_{comfort})$ host vehicle decelerates to cut-in deceleration amount
$(b_{cut-in})$ host vehicle maintains current acceleration $(a_{ego})$

(51) Int. Cl.
  *B60W 30/18*      (2012.01)
  *G06N 20/00*      (2019.01)
(52) U.S. Cl.
  CPC ....... *G06N 20/00* (2019.01); *B60W 2520/105*
      (2013.01); *B60W 2552/53* (2020.02); *B60W*
        *2554/4041* (2020.02); *B60W 2554/4042*
      (2020.02); *B60W 2554/802* (2020.02); *B60W*
                *2556/40* (2020.02)

(56) References Cited

U.S. PATENT DOCUMENTS

| | | | |
|---|---|---|---|
| 2018/0022361 A1 | 1/2018 | Rao et al. | |
| 2021/0009127 A1 | 1/2021 | Horiba et al. | |
| 2022/0410878 A1* | 12/2022 | Osogami | G06N 5/045 |
| 2024/0351615 A1* | 10/2024 | Song | B60W 30/18163 |

FOREIGN PATENT DOCUMENTS

| | | | |
|---|---|---|---|
| JP | 2019-055675 | A | 4/2019 |
| JP | 2021-014175 | A | 2/2021 |
| JP | 7134310 | B1 | 9/2022 |
| JP | 2023-063239 | A | 5/2023 |
| KR | 10-2020-0075916 | A | 6/2020 |
| KR | 10-2020-0075935 | A | 6/2020 |

OTHER PUBLICATIONS

Kyoungtae Ji et al.; "Lane-Merging Strategy for a Self-Driving Car in Dense Traffic Using the Stackelberg Game Approach"; Electronics 2021; 10(8):894; Apr. 8, 2021; https://doi.org/10.3390/electronics10080894;pp. 1-16.
Office Action issued in KR 10-2024-0045305; mailed by the Korean Ministry of Intellectual Property on Feb. 6, 2026.

* cited by examiner

FIG.5

| | | | host vehicle | |
|---|---|---|---|---|
| | action strategy | | Yield | Not Yield |
| target vehicle | | probability | $q$ | $1-q$ |
| | Merge | $p$ | $U_m(M,Y), U_e(M,Y)$ | $U_m(M,NY), U_e(M,NY)$ |
| | Wait | $1-p$ | $U_m(W,Y), U_e(W,Y)$ | $U_m(W,NY), U_e(W,NY)$ |

FIG.10

| | choose behavior | target vehicle | host vehicle |
|---|---|---|---|
| $U_M(M, Y) > U_M(W, Y)$ AND $U_E(M, Y) > U_E(M, NY)$ | PS=(M,Y) | merge | yield |
| $U_M(W, Y) > U_M(M, Y)$ AND $U_E(W, Y) > U_E(W, NY)$ | PS=(W,Y) | wait | yield |
| $U_M(M, NY) > U_M(W, Y)$ AND $U_E(M, NY) > U_E(M, Y)$ | PS=(M,NY) | merge | not yield |
| $U_M(M, Y) > U_M(W, Y)$ AND $U_E(M, Y) > U_E(M, NY)$ | PS=(W,NY) | wait | not yield |

FIG.11

| choose behavior | compare | target vehicle | host vehicle |
|---|---|---|---|
| | $p>0.5, q>0.5$ | merge | yield |
| | $p<0.5, q>0.5$ | wait | yield |
| MS = (p,q) | $p>0.5, q<0.5$ | merge | not yield |
| | $p<0.5, q<0.5$ | wait | not yield | expected value when target vehicle chooses 'merge'
$E_M(M,q) = q \cdot U_M(M,Y) + (1-q) \cdot U_M(M,NY)$ expected value when target vehicle chooses 'wait'
$E_M(W,q) = q \cdot U_M(W,Y) + (1-q) \cdot U_M(W,NY)$ expected value when host vehicle chooses 'yield'
$E_E(Y,p) = p \cdot U_E(M,Y) + (1-p) \cdot U_E(W,Y)$ expected value when host vehicle chooses 'not yield'
$E_E(NY,p) = p \cdot U_E(M, NY) + (1-p) \cdot U_E(W,NY)$ $E_M(M,q) = E_M(W,q)$ calculate q from, $E_E(Y,p) = E_E(NY,p)$ calculate p from

VEHICLE CONTROL METHOD AND DEVICE

CROSS-REFERENCE TO RELATED APPLICATION

This application claims priority from Korean Patent Application No. 10-2024-0045305, filed on Apr. 3, 2024, which is hereby incorporated by reference for all purposes as if fully set forth herein.

BACKGROUND

Field

Embodiments of the disclosure relate to a vehicle control technology for controlling the behavior of a vehicle by determining whether to yield to a merging vehicle.

Description of Related Art

Recently, in the automobile industry, as the development of information and communication technology and the importance of individual leisure increase, the development of driving intelligence assistance and autonomous driving technology is attracting attention.

Here, autonomous driving refers to the technology for controlling the vehicle by recognizing the surrounding environment without intervention of the driver and determining the driving context using external information such as map information and sensors configured in the vehicle such as light detection and ranging (LiDAR) or global positioning system (GPS). Through this, it is possible to alleviate the driver's driving burden and provide an advantage of securing a time for productivity or leisure in the vehicle.

Further, various in-vehicle driving intelligence assistance functions such as lane keeping assistance technology and vehicle follow control technology are being added and actively used.

However, the above-described functions of the vehicle are implemented based on a plurality of sensors configured in the vehicle and information received from the outside. Further, when the function is operated based on a specific context and preset conditions are not met, the functions may not operate normally.

Therefore, for more precise vehicle control, it should be possible to receive and analyze various pieces of information, such as precise map information and lidar sensors.

In particular, in an area where vehicles actively merge, such as a pocket lane, when the conventional vehicle follow-up control technology or autonomous driving technology is used, the feeling of the driver may be degraded by the cut-in vehicle. Further, when it is not predicted/determined in advance whether the cut-in vehicle will merge the host lane and whether the host vehicle will yield to the merging, a problem in vehicle driving safety may occur due to rapid cut-in.

Therefore, there is a need for a technology for predicting the behavior of a vehicle driving in another lane other than a host lane and determining the behavior of the host vehicle.

BRIEF SUMMARY

The present embodiments provide a vehicle control technology for controlling the behavior of a vehicle by determining whether to yield to a merging vehicle.

In an aspect, the present embodiments may provide a vehicle control device comprising a target selector determining a presence of a pocket lane using precise map information, and selecting a target vehicle driving in the pocket lane, a target information producer producing information about the target vehicle and distance information about a merging section, a yield determiner determining whether to yield to the target vehicle using a payoff matrix produced based on an acceleration variation of the host vehicle and information about a time required for the target vehicle to enter a driving lane where a host vehicle is driving, and a control signal generator generating a control signal for controlling a behavior of the host vehicle based on a result of determining whether to yield.

In another aspect, the present embodiments may provide a vehicle control method comprising selecting a target vehicle driving in the pocket lane by determining a presence of a pocket lane using precise map information, producing information about the target vehicle and distance information about a merging section, determining whether to yield to the target vehicle using a payoff matrix produced based on an acceleration variation of the host vehicle and information about a time required for the target vehicle to enter a driving lane where a host vehicle is driving, and generating a control signal for controlling a behavior of the host vehicle based on a result of determining whether to yield.

According to the present embodiments, it is possible to control the behavior of a vehicle by determining whether to yield to a merging vehicle.

DESCRIPTION OF DRAWINGS

The above and other objects, features, and advantages of the disclosure will be more clearly understood from the following detailed description, taken in conjunction with the accompanying drawings, in which:

FIG. 5 is a view illustrating a payoff matrix, according to an embodiment;

FIG. 10 is a view illustrating an operation of determining whether to yield according to a pure strategy according to an embodiment;

FIG. 11 is a view illustrating an operation of determining whether to yield based on probability according to a mixed strategy, according to an embodiment; and

3

Figure 12:
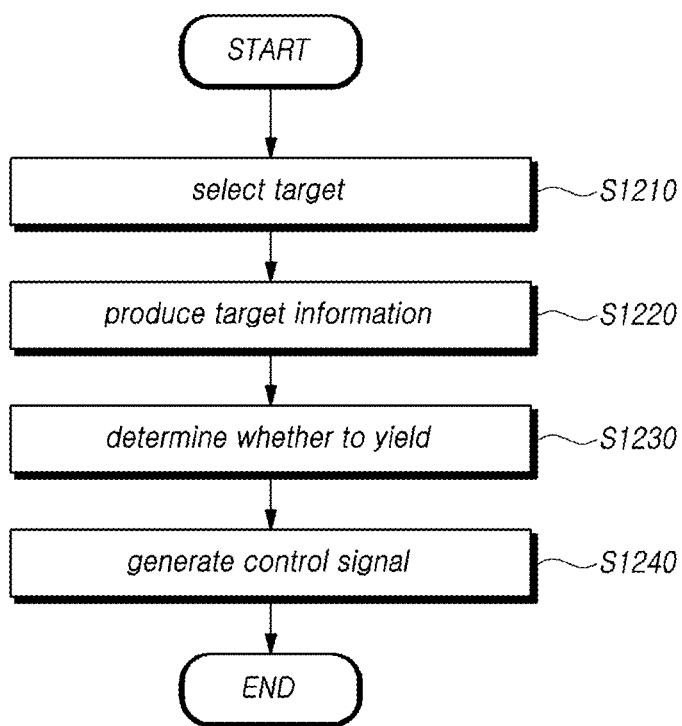

FIG. 12 is a view illustrating a vehicle control method according to an embodiment.

DETAILED DESCRIPTION

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

As used herein, 'pocket lane' may refer to a lane that adds to merge the main line or a lane that adds to diverge from the main line and exit. Or, 'pocket lane' may refer to a lane that adds for a right turn, a left turn, or a U-turn.

In order for a vehicle to provide autonomous driving or driver assistance, it is necessary to accurately recognize lane information and surrounding contexts. In this case, the presence or absence of a pocket lane is information necessary to recognize the presence of a vehicle coming from the pocket lane or a vehicle entering the pocket lane in advance.

However, the conventional detailed map information only provides information such as geometry information and lane width related to the lane, but does not provide information about whether the lane corresponds to a pocket lane. Further, the precise map information provides information that is not standardized for each company that generates it. Accordingly, it is difficult for the vehicle control device to use the precise map information.

Further, in the case of a pocket lane which a vehicle enters, it is highly likely that a vehicle of the pocket lane enters the lane in which the vehicle is driving. Accordingly, the conventional operation of determining a cut-in vehicle and controlling the acceleration/deceleration in response to the cut-in vehicle may impair the driving comfort due to the sudden occurrence of the cut-in vehicle.

For example, conventionally, when a cut-in vehicle enters the lane in which the host vehicle is driving, the behavior of the cut-in vehicle is finally determined and the behavior of the host vehicle is controlled. However, since the vehicle driving in the pocket lane will enter the lane in which the vehicle is driving before the point where the pocket lane ends, it is necessary to determine whether the cut-in vehicle enters in advance. In other words, it is possible to smoothly control the behavior of the host vehicle by determining the pocket lane before the active entry operation of the cut-in vehicle occurs.

It is also necessary to determine whether the cut-in vehicle will enter the space ahead of the vehicle or wait. The host vehicle may also be required to determine whether to yield to the cut-in vehicle.

In such a circumstance, the disclosure provides a technology for determining whether there is a pocket lane using only geometry information by default/commonly included in precise map information and determining whether to yield to the target vehicle driving in the pocket lane.

It is assumed in the following description that a vehicle control device and a method thereof are installed in a vehicle. However, for a better understanding, the following description focuses primarily on embodiments used for a vehicle. Accordingly, the vehicle control technology according to the disclosure is not limited to being installed in a vehicle. In other words, the vehicle control technology according to the disclosure may be installed and utilized in various devices such as a simulator or a portable terminal, and is not limited thereto.

Figure 1:
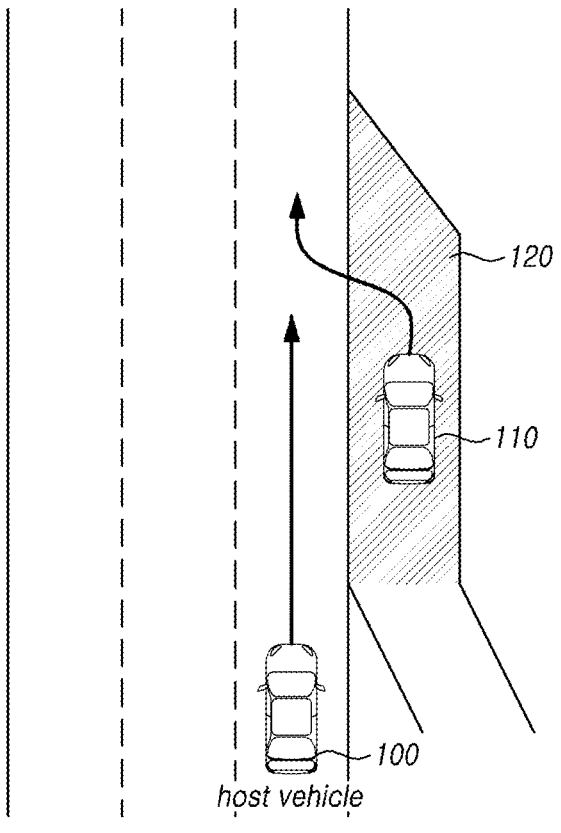
FIG. 1 is a view illustrating a necessity of determining a pocket lane according to an embodiment.

FIG. 1 is a view illustrating a necessity of determining a pocket lane according to an embodiment.

Referring to FIG. 1, in order to implement an autonomous vehicle or a vehicle equipped with a driving assistance function, precise map information capable of precisely identifying the road context is required. In recent years, automobile manufacturers are increasingly using precise map information to equip the vehicle with advanced autonomous driving systems from level 2 to level 4.

While the host vehicle 100 is driving on the three-lane road, the fourth lane road ahead may be formed as the pocket lane 120. In the pocket lane 120, another vehicle 110 for entering the driving lane of the third lane may be present. In this case, the vehicle 100 driving on the third lane may need to be prepared for the other vehicle 110 trying to enter the third lane from the pocket lane 120.

Further, the host vehicle 100 may determine whether to yield when the other vehicle 110 enters the driving lane of the host vehicle 100. In this case, the host vehicle 100 may determine whether to yield by determining whether the other vehicle 110 will wait or merge in front of the host vehicle 100.

In the case of the autonomous driving function or the driving assistance function, the preceding vehicles may be monitored and collisions may be prevented using a radar, a camera, a lidar sensor, or the like. However, the collision prevention function may be operated when the other vehicle 110 is detected by a sensor installed in the host vehicle 100 and the other vehicle 110 is detected as entering the third lane, which is the driving lane of the host vehicle 100.

When there is another vehicle 110 that should enter the driving lane in a short section such as the pocket lane 120, the time for detecting the other vehicle 110 and determining whether to enter the driving lane may be extremely limited. Further, depending on whether the other vehicle 110 is waiting or merging, duplicate actions on whether the vehicle 100 yields may occur, causing a dangerous context.

Therefore, when the pocket lane 120 is present, it is necessary to determine whether to yield to the other vehicle 110 more quickly in advance. Further, to determine whether to yield to the other vehicle 110 or whether the other vehicle 110 yields, it is necessary to quickly determine that the other vehicle 110 is driving in the pocket lane 120.

However, precise map information is produced by various map makers. For this reason, information about the pocket lane 120 may be different for each map maker, and in many cases, information is not provided.

In this context, if it is possible to determine whether the pocket lane 120 is present in advance, and if it is possible to quickly determine that the other vehicle 110 is driving in the pocket lane 120, it may be possible to more quickly determine the risk of collision and perform an operation for preventing collision. Further, it is necessary to control the behavior of the host vehicle 100 considering whether the other vehicle 110 merges and whether the host vehicle 100 yields.

Accordingly, a technique of determining whether there is a pocket lane based on precise map information, selecting a target vehicle, and determining whether to yield is described below. A more accurate determination is required in that a pocket lane may appear in various forms, and a technology for determining whether a pocket lane is present using only geometry information provided as default regardless of the map maker is provided.

Figure 2:
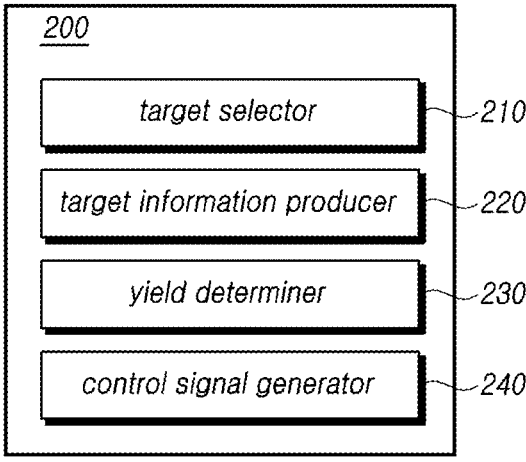
FIG. 2 is a view illustrating a vehicle control device according to an embodiment.

FIG. 2 is a view illustrating a vehicle control device according to an embodiment.

Referring to FIG. 2, a vehicle control device 200 may include a target selector 210 for determining the presence of a pocket lane using precise map information and selecting a target vehicle driving in the pocket lane.

The target selector 210 may determine whether there is a pocket lane in front of the host vehicle. Further, when there is a pocket lane, the target selector 210 may select the presence or absence of a target vehicle and the target vehicle from among a plurality of vehicles.

For example, the target selector 210 may determine whether there is a pocket lane using geometry information included in the precise map information. For example, the target selector 210 may receive precise map information through a communication device in the host vehicle. The precise map information may include geometry information associated with lanes. For example, the geometry information may be provided in the form of a line connecting the center points of the lanes. Further, the precise map information may include information about the width of the lane. Accordingly, the target selector 210 may identify the number of pieces of geometry information, and when the number of pieces of geometry information is changed, the target selector 210 may determine whether there is a pocket lane in front using the change. Specifically, the target selector 210 may calculate the number of pieces of geometry information in each section divided at regular intervals for the front lane in which the vehicle is to drive, and determine whether there is a pocket lane according to a change in the number of pieces of geometry information in each section.

Meanwhile, when it is determined that there is a pocket lane, the target selector 210 may detect another vehicle driving in the pocket lane. When another vehicle is present in the pocket lane, the target selector 210 may select the target vehicle based on the relative distance to the host vehicle. For example, the target selector 210 may select one other vehicle having a shortest relative distance from the host vehicle as the target vehicle.

Further, the target selector 210 may select the other vehicle having the highest probability as the target vehicle according to the probability calculated according to a preset algorithm using relative speed and relative distance information about the other vehicle. For example, the target selector 210 may select a predetermined number of other vehicles having a close relative distance to the host vehicle, and select another vehicle having a high relative speed from among the other vehicles as the target vehicle. Further, the target selector 210 may set the target vehicle using various preset algorithms.

The vehicle control device 200 may include a target information producer 220 that produces information about the target vehicle and distance information about the merging section.

For example, the target information producer 220 may produce relative speed information about the target vehicle and the host vehicle, speed information about the target vehicle, and location information about the target vehicle. Further, the target information producer 220 may produce distance information about the merging section based on the location information about the target vehicle.

If the target vehicle is selected, the target information producer 220 may be required to analyze information about the target vehicle and determine a merging section in which the target vehicle is most likely to merge according to the end of the pocket lane.

The pocket lane generally has a form in which the width of the lane gradually decreases for merging. Therefore, the target vehicle driving in the pocket lane should merge the driving lane before the pocket lane ends. Therefore, it is necessary to clearly set the merging section to determine whether the vehicle yields in the merging section and whether the target vehicle merges.

To that end, the target information producer 220 needs to produce at least one of the speed of the target vehicle, the relative speed of the target vehicle, and location information about the target vehicle. Using this, the possibility of the target vehicle to merge in the merging section may be determined.

Meanwhile, the target information producer 220 may select a tapering area in the pocket lane and produce the distance from the location of the target vehicle to the tapering area as the distance information about the merging section. The tapering area may be set as a section in which the lane width of the pocket lane decreases. The tapering area may be identified using the geometry information. For example, the tapering area may be defined as an area in which the relative distance between the geometry information about the driving lane and the geometry information about the pocket lane is reduced.

The vehicle control device 200 may include a yield determiner 230 for determining whether to yield to the target vehicle using a payoff matrix produced based on information about the time required for the target vehicle to enter the driving lane on which the vehicle is driving and an acceleration variation of the host vehicle.

For example, the required time information may be produced based on expected acceleration information and distance information about the target vehicle. The yield determiner 230 may use the distance information about the merging section and the expected acceleration information about the target vehicle to produce the required time information that the target vehicle is expected to merge in the merging section.

Meanwhile, the yield determiner 230 may determine whether to yield based on the payoff matrix and the game theory.

For example, the yield determiner 230 may use game theory-based modeling and a pay-off matrix calculation considering the interaction between the host vehicle and the target vehicle.

The yield determiner 230 may determine whether to yield using a preset Nash equilibrium-based behavior determination algorithm using the payoff matrix.

The payoff matrix may be calculated with respect to the host vehicle and the target vehicle, and the yield determiner 230 may produce the payoff matrix based on a target utility function preset to receive a higher payoff as the required time decreases and a host vehicle utility function preset to receive a higher payoff as the acceleration variation of the host vehicle decreases. In other words, the yield determiner 230 may produce each payoff value of the payoff matrix based on the target utility function and the host vehicle utility function.

To that end, the yield determiner 230 may determine a payoff value (e.g., a payoff value) based on the preset target utility function and the preset host vehicle utility function, separately for a case in which the target vehicle waits or merges when the host vehicle yields and a case in which the target vehicle waits or merges when the host vehicle does not yield, and produce the payoff matrix as the payoff value.

When the payoff matrix is produced, the yield determiner 230 may determine whether the host vehicle yields using the game theory.

For example, when the payoff matrix is produced, the yield determiner 230 may determine whether the host vehicle yields and whether the target vehicle merges, based on a comparison result between the payoff values of the payoff matrix. For example, the yield determiner 230 may determine whether to yield using a pure strategy game theory that selects a strategy in a balanced state without an incentive to change the strategy of the vehicle while considering the behavior of the target vehicle based on the payoff matrix.

As another example, the yield determiner 230 may produce a probability for the host vehicle to yield and a probability for the target vehicle to merge using a preset probability calculation algorithm using the payoff value. The yield determiner 230 may determine whether to yield using each calculated probability value. For example, the yield determiner 230 may calculate the probability of selecting each action as the expected value of the payoff matrix and then compare the same to determine whether to yield using a mixed strategy game theory of selecting a strategy.

As another example, the yield determiner 230 may determine whether to yield by preferentially using the pure strategy, but may determine whether to yield using the mixed strategy when the pure strategy is not present.

The yield determiner 230 may determine whether the target vehicle merges or waits through the above-described operation, and may determine whether the host vehicle yields accordingly.

The vehicle control device 200 may include a control signal generator 240 that generates a control signal for controlling the behavior of the host vehicle based on a result of determining whether to yield.

For example, the control signal generator 240 may produce a deceleration value determined according to whether the target vehicle merges and whether the host vehicle yields. The control signal generator 240 may generate and transmit a control signal to an acceleration part or a deceleration part of the vehicle to control the behavior of the vehicle with the produced deceleration value.

For example, the control signal generator 240 may generate a control signal for setting the deceleration amount of the host vehicle to a comfort deceleration amount that slowly increases the deceleration amount of the host vehicle in advance when the host vehicle yields and the target vehicle merges. Alternatively, the control signal generator 240 may generate a control signal for setting the deceleration amount of the host vehicle to the deceleration amount corresponding to the cut-in vehicle when the target vehicle merges without yielding by the host vehicle. Alternatively, the control signal generator 240 may generate a control signal for setting the deceleration amount of the host vehicle to a comfort deceleration amount that slowly increases the deceleration amount of the host vehicle in advance when the host vehicle yields and the target vehicle waits. Alternatively, the control signal generator 240 may set the deceleration amount of the host vehicle to 0 when the host vehicle does not yield, and the target vehicle waits to generate a control signal so that the current acceleration of the host vehicle is maintained.

As described above, according to the disclosure, it is possible to select the presence of a precise pocket lane and a target vehicle in front of a vehicle driving. Further, according to the disclosure, it is possible to predict whether the target vehicle present in the pocket lane merges and determine whether the host vehicle yields accordingly, using a payoff matrix and a game theory. The so determined behavior of the host vehicle and the target vehicle may be used to set a deceleration force or acceleration force for controlling the behavior of the host vehicle.

Accordingly, it is possible to automatically determine the intention to control the behavior of the vehicle more accurately, and to stably control the behavior of the host vehicle, thus enhancing stability.

Hereinafter, operations performed by the above-described vehicle control device are described in more detail. Each operation described below may be performed by the vehicle control device and method in any combination.

Figure 3:
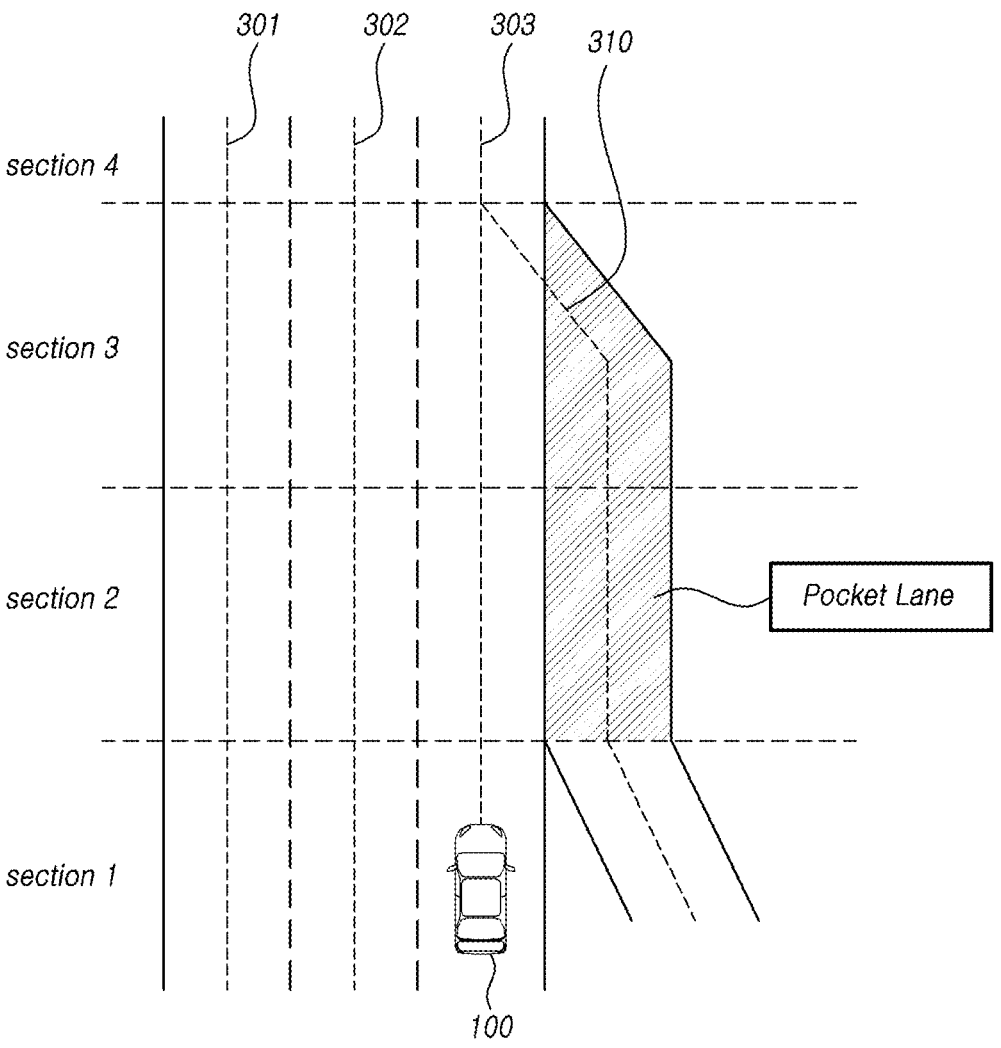
FIG. 3 is a view illustrating an operation of determining whether there is a pocket lane according to an embodiment.

FIG. 3 is a view illustrating an operation of determining whether there is a pocket lane according to an embodiment.

Referring to FIG. 3, the precise map information may include information about four preset sections. Here, the sections are referred to as sections 1 to 4 in the description. The preset sections are illustrative and are not limited thereto.

The precise map information may include geometry information 301, 302, 303, and 310 associated with each lane in the preset section. For example, the geometry information 301, 302, 303, and 310 may be included, as a line connecting the central point of each lane, in the precise map information. Alternatively, the geometry information 301, 302, 303, and 310 may be extracted by the target selector by connecting coordinate information included in the precise map information.

The geometry information 301, 302, 303, and 310 is represented as a line connecting the central point of each lane. The precise map information does not include information about lanes, and may include information about each lane only as the geometry information 301, 302, 303, and 310.

When the vehicle 100 is driving on the third lane, it is necessary to identify the pocket lane of the fourth lane. However, since the precise map information includes only the geometry information 301, 302, 303, and 310, it may be difficult to clearly identify the presence of the pocket lane.

Meanwhile, sections 1 to 4, which are preset sections, may all be set to have the same interval. Alternatively, sections 1 to 4 may be set to have different intervals. For example, the interval of section 1 may be set to be the widest, and the intervals may be set to be narrower toward section 4 at a predetermined ratio. Conversely, the interval of section 1 may be set to be the narrowest, and the intervals may be set to be wider toward section 1 at a predetermined ratio.

Alternatively, when the preset sections are set to have the same interval or different intervals, the preset sections may be variably set according to the vehicle speed of the host vehicle 100. For example, as the speed of the vehicle increases, the preset sections having the same interval may be set to be wider.

The target selector according to the disclosure may determine whether there is a pocket lane by producing change information using the number of pieces of geometry information in each section. In this case, the change information may be produced in a first direction or a second direction. The description focuses on the second direction that is a direction from far to close to the host vehicle 100, and is likewise applied even when it is in the first direction.

If the host vehicle 100 receives the precise map information set to have four sections, the number of pieces of geometry information in each section is calculated.

Geometry information 301, 302, and 303 is included in section 4. Therefore, in section 4, three pieces of geometry information are produced. In section 3, geometry information about 310 is produced in addition to 301, 302, and 303. Therefore, in section 3, four pieces of geometry information are produced. Accordingly, one piece of geometry information is increased from section 4 to section 3. In section 2, four pieces of geometry information are produced in the same manner as in section 3, and in section 1, three pieces of geometry information 301, 302, and 303 are produced.

Accordingly, the information extraction method may identify that the total number of lanes increases in sections 3 and 2, and determine that a pocket lane is present in sections 3 and 2. When it is determined that the pocket lane is longer than or equal to a preset length, only a section within the preset length may be determined as the pocket lane. Further, as is described below, the tapering area of the corresponding pocket lane may be determined using the distance between the change information and the geometry information.

Accordingly, the vehicle control device may determine whether there is a pocket lane and the location of the pocket lane.

Figure 4:
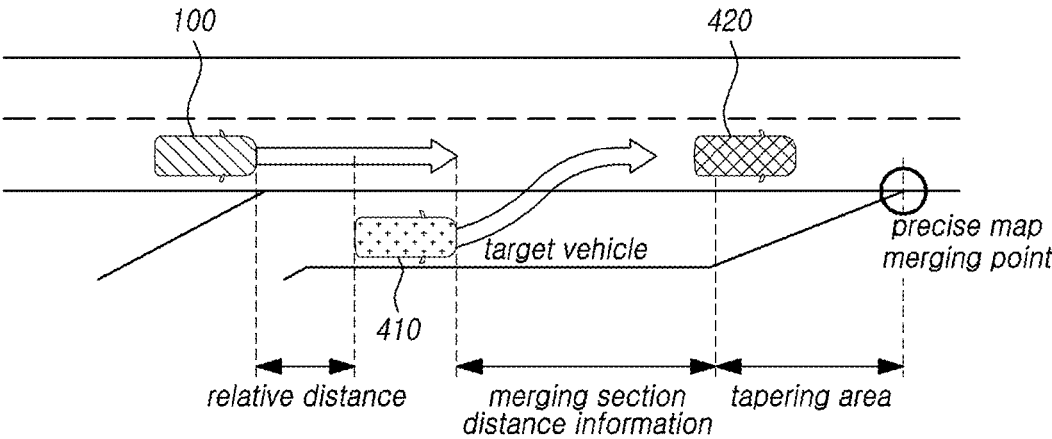
FIG. 4 is a view illustrating an operation of selecting a target and producing target information according to an embodiment.

FIG. 4 is a view illustrating an operation of selecting a target and producing target information according to an embodiment.

Referring to FIG. 4, the target selector may determine the presence of a pocket lane using precise map information, and select a target vehicle 410 driving in the pocket lane. For example, when there is a vehicle in the pocket lane, the target selector may select the vehicle having a shortest relative distance from the host vehicle as the target vehicle 410.

For example, the target selector may determine that there is a pocket lane ahead in a context where the host vehicle 100 controls to follow the preceding vehicle 420. The precision map information may be used to determine whether there is a pocket lane as described above. Alternatively, determining whether there is a pocket lane may be determined based on an in-vehicle device such as a navigation device.

When there is a pocket lane, the target selector may detect another vehicle driving in the pocket lane using an in-vehicle sensor. If other vehicles are detected, the target selector may produce relative distance information between each other vehicle and the host vehicle 100. For example, the target selector may select another vehicle located closest to the host vehicle 100 as the target vehicle 410. As another example, the target selector may produce relative speed information and relative distance information about the host vehicle 100 and another vehicle, and select the target vehicle 410 using the relative speed information and the relative distance information.

If the target vehicle 410 is selected, the vehicle control device may perform a yield determination operation based on whether the target vehicle 410 merges the space between the preceding vehicle 420 and the host vehicle 100.

Meanwhile, the target information producer may produce relative speed information about the target vehicle 410 and the host vehicle, speed information about the target vehicle 410, and location information about the target vehicle 410. Further, the target information producer may produce various pieces of information related to the target vehicle 410.

The target information producer may produce distance information about the merging section based on the location information about the target vehicle 410. To that end, the target information producer may select and utilize the tapering area in the pocket lane.

For example, the target information producer may select a tapering area in the pocket lane and produce the distance from the location information about the target vehicle 410 to the tapering area as the distance information about the merging section. FIG. 4 illustrates an example of producing the distance from the front of the target vehicle 410 to the tapering area as the merging section distance information. However, this is exemplary, and when the location information about the target vehicle 410 is produced as the center point, the target information producer may produce the distance from the center point of the target vehicle 410 to the tapering area as the merging section distance information.

The tapering area may be set as a section in which the lane width of the pocket lane decreases. The tapering area may be identified using the geometry information. For example, the tapering area may be defined as an area in which the relative distance between the geometry information about the driving lane and the geometry information about the pocket lane is reduced. Alternatively, the target information producer may produce the distance between the pieces of geometry information, and determine the area in which the distance produced using the increased pieces of geometry information is less than or equal to a threshold as the tapering area. The tapering area may be set as a point where the width of the pocket lane gradually reduces toward an end of the pocket lane. In the merging section, it is highly likely that the target vehicle 410 merges the driving lane of the host vehicle 100, and, accordingly, it is possible to calculate the merging time of the target vehicle.

For example, the required time information may be produced based on expected acceleration information and distance information about the target vehicle 410. The speed information may be identified at the location of the target vehicle 410, and the expected acceleration information may be produced using a change in the speed information. Alternatively, the expected acceleration of the target vehicle 410 may be produced using a payoff matrix to be described below. By using the produced estimated acceleration and distance information about the target vehicle 410, the time required for the target vehicle 410 to merge the driving lane may be calculated. The required time information may be used to determine a payoff value of the payoff matrix of the yield determiner.

As described above, the yield determiner may determine whether to yield to the target vehicle using the payoff matrix produced based on the information about the time required for the target vehicle to enter the driving lane on which the host vehicle is driving and the acceleration variation of the host vehicle. The payoff matrix may include a payoff value according to each action strategy of the host vehicle and the target vehicle as a factor.

The payoff matrix may be produced based on a target utility function preset to receive a higher payoff as the required time decreases and a host vehicle utility function preset to receive a higher payoff as the acceleration variation of the host vehicle decreases.

FIG. 5 is a view illustrating a payoff matrix, according to an embodiment.

Referring to FIG. 5, the action strategies of the host vehicle and the target vehicle may be divided into two. For example, the host vehicle may be divided into a case of yielding to the target vehicle and a case of not yielding. The target vehicle may be divided into a case of merging the driving lane and a case of waiting to merge behind the host vehicle. In each case, each value of the payoff matrix may be determined as a payoff value such as Um(M, Y). Here, M denotes Merge of the target vehicle, and Y denotes Yield of the host vehicle. W denotes Wait of the target vehicle, and NY denotes Not Yield of the host vehicle. Hereinafter, Um denotes the payoff value of the target vehicle, and Ue denotes the payoff value of the host vehicle.

For example, Um(M, Y) is the payoff value of the target vehicle when the target vehicle merges and the vehicle yields. Ue(M, Y) is the payoff value of the host vehicle when the target vehicle merges and the host vehicle yields. Um(M, NY) is the payoff value of the target vehicle when the target vehicle merges and the vehicle does not yield. Ue(M, NY) is the payoff value of the host vehicle when the target vehicle merges and the host vehicle does not yield. Similarly, Um(W, Y) is the payoff value of the target vehicle when the target vehicle waits and the vehicle yields. Ue(W, Y) is the payoff value of the host vehicle when the target vehicle waits and the host vehicle yields. Um(W, NY) is the payoff value of the target vehicle when the target vehicle waits and the vehicle does not yield. Ue(W, NY) is a payoff value of a host vehicle when the target vehicle waits and the host vehicle does not yield.

Using the payoff value, the yield determiner may determine whether the host vehicle yields. In other words, the yield determiner may produce and use game theory-based modeling and a payoff matrix to determine whether to yield considering the interaction between the host vehicle and the target vehicle.

Meanwhile, a probability for the respective action strategies of the host vehicle and the target vehicle may also be calculated. Each probability may be expressed as p, q, or the like, which may be used in the case of the mixed strategy described below.

Game theory refers to a methodology for selecting the best strategy considering the opposite party's behavior when multiple participants should simultaneously make a decision. Hereinafter, an embodiment of determining a payoff value and determining an action strategy according to game theory is described.

Figure 6:
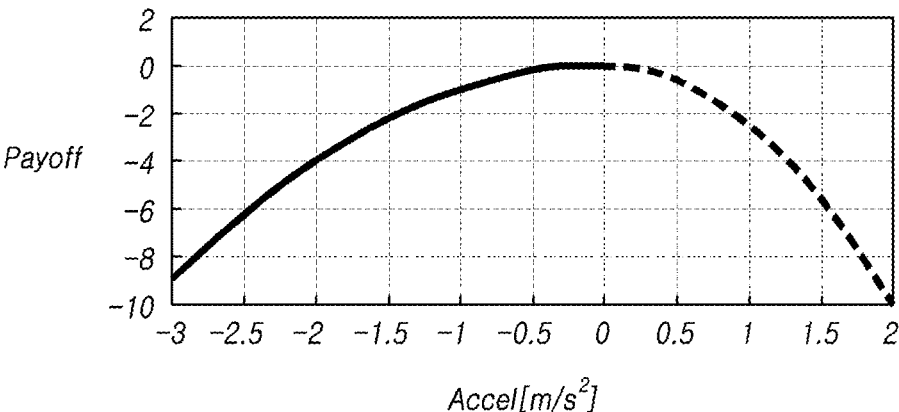
FIG. 6 is a view illustrating an example of a host vehicle utility function according to an embodiment.

FIG. 6 is a view illustrating an example of a host vehicle utility function according to an embodiment.

Referring to FIG. 6, the yield determiner may produce a payoff value based on a host vehicle utility function preset to receive a higher payoff as the acceleration variation of the host vehicle decreases. For example, the expected deceleration value of the host vehicle may be changed according to the behavior of the host vehicle and the target vehicle. In this case, the payoff value according to each deceleration speed may be calculated using a preset and stored host vehicle utility function.

For example, the host vehicle utility function may be set to receive a higher payoff as the acceleration variation of the host vehicle decreases before and after the target vehicle enters the host lane.

Figure 7:
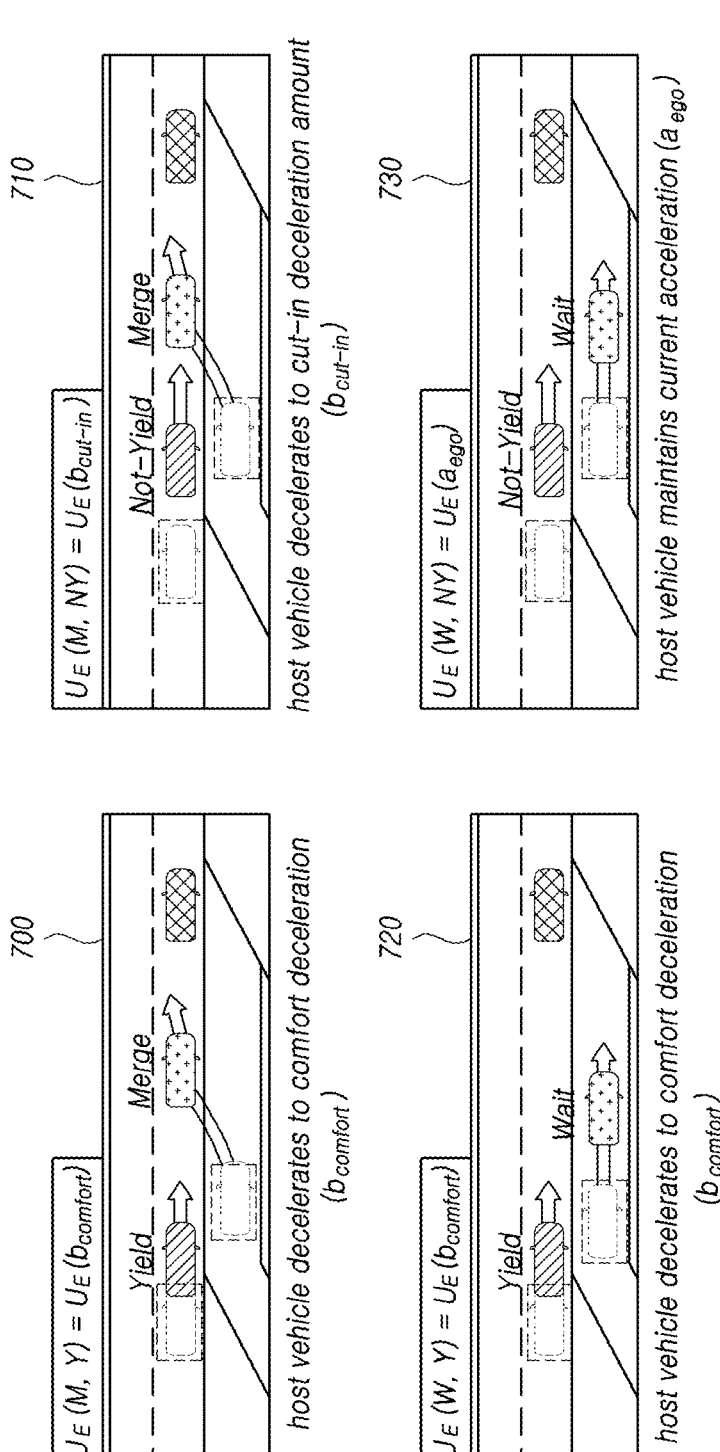
FIG. 7 is a view illustrating a deceleration amount of a host vehicle according to an operation of a target vehicle and an operation of the host vehicle, according to an embodiment.

FIG. 7 is a view illustrating a deceleration amount of a host vehicle according to an operation of a target vehicle and an operation of the host vehicle, according to an embodiment.

Referring to FIG. 7, for each of the case where the target vehicle merges and the vehicle yields (700), the case where the target vehicle merges and the vehicle does not yield (710), the case where the target vehicle waits and the vehicle yields (720), and the case where the target vehicle waits and the vehicle does not yield (730), the acceleration/deceleration of the host vehicle may be calculated.

For example, cases 700 and 720 are cases in which the host vehicle yields, and the host vehicle may decelerate at a preset comfort deceleration. Case 710 is a case where the host vehicle does not yield in advance and the target vehicle cuts in, and the host vehicle should decelerate by a deceleration amount according to the cut-in vehicle. Case 730 is a case where the current acceleration is maintained when the host vehicle does not yield. The cut-in deceleration amount may be calculated as a deceleration amount required for the target vehicle to enter the main line based on a preset driver model. This is to calculate with a driver model required for general cut-in vehicle detection, and may require a high deceleration amount. Meanwhile, in case 730, if the host vehicle controls to follow the preceding vehicle, the acceleration/deceleration amount may be calculated accordingly. Accordingly, the deceleration amount for Ue(M, Y), Ue(M, NY), Ue(W, Y), and Ue(W, NY) may be calculated, and the payoff value may be determined through the host vehicle utility function of FIG. 5.

Figure 8:
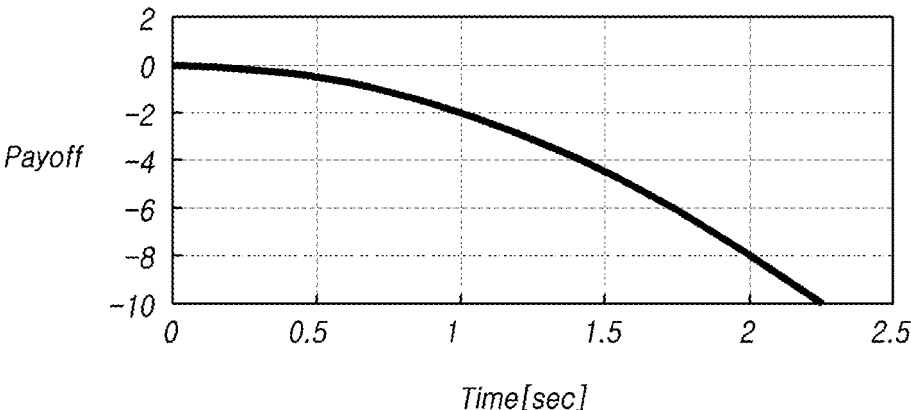
FIG. 8 is a view illustrating a target utility function according to an embodiment.

FIG. 8 is a view illustrating a target utility function according to an embodiment.

In the case of the target vehicle, the payoff value may be determined based on the target utility function. For example, the yield determiner may determine the payoff value using a target utility function preset to receive a higher payoff as the time required for the target vehicle to merge decreases.

The target utility function may be determined through an experiment or the like, and as the required time increases, the payoff value may be set to decrease.

Figure 9:
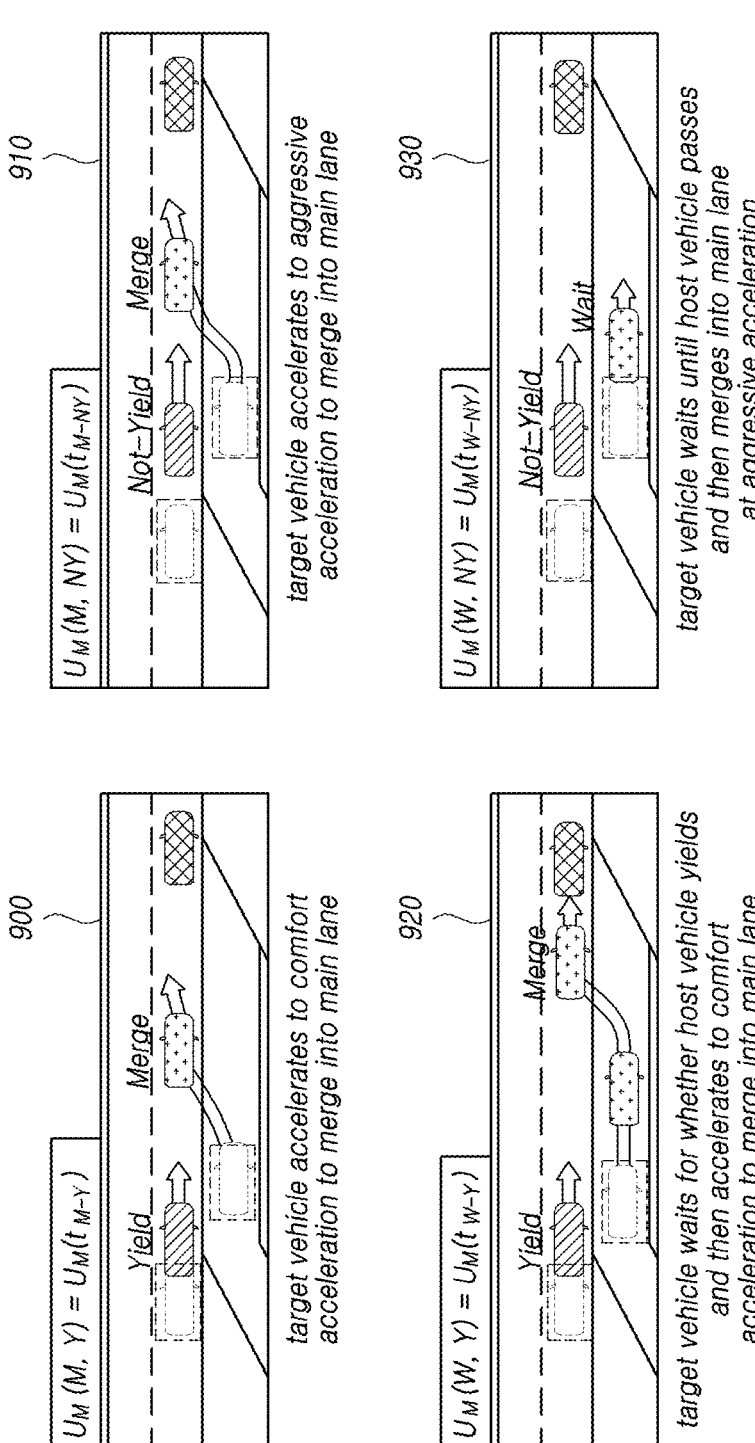
FIG. 9 is a view illustrating a time required for a target vehicle according to an operation of the target vehicle and an operation of a host vehicle, according to an embodiment.

FIG. 9 is a view illustrating a time required for a target vehicle according to an operation of the target vehicle and an operation of a host vehicle, according to an embodiment.

Referring to FIG. 9, when it is assumed that the target vehicle merges the main line at the merging point (e.g., the last point of the merging section) using the merging section distance information at an expected acceleration, the yield determiner may produce the required time information using the arrival completion time. Alternatively, the yield determiner may calculate the required time based on the time taken for the target vehicle to complete the merging at the predetermined merging point at the expected acceleration.

Similar to FIG. 7, for each of the case where the target vehicle merges and the vehicle yields (900), the case where the target vehicle merges and the vehicle does not yield (910), the case where the target vehicle waits and the vehicle yields (920), and the case where the target vehicle waits and the vehicle does not yield (930), the required time of the target vehicle may be calculated.

In cases 900 and 920, the required time may be calculated under the assumption that the target vehicle accelerates at the comfort acceleration and merges. In cases 910 and 930, the required time may be calculated under the assumption that the target vehicle accelerates at an aggressive acceleration and merges. In each case, the acceleration may be determined according to a preset target vehicle expected acceleration calculation logic. For example, in the host vehicle, an equation for obtaining the expected comfort acceleration and the expected aggressive acceleration may be set in advance using the speed, the acceleration/deceleration, the location, the distance information to the merging section of the target vehicle in a laboratory, etc.

The yield determiner may expect the required time of the target vehicle in each case using the preset algorithm and calculate the payoff value using the expected time.

If the payoff matrix is determined through FIGS. 6 to 9, the yield determiner predicts the behavior of the host vehicle and the target vehicle using the Nash equilibrium-based behavior determination logic. The Nash equilibrium-based behavior determination logic is a determination method of game theory modeling, and through this, the best strategy of the host vehicle may be selected.

FIG. 10 is a view illustrating an operation of determining whether to yield according to a pure strategy according to an embodiment.

Referring to FIG. 10, the yield determiner may determine whether to yield based on a comparison result between payoff values. Through this, the best strategy of the vehicle may be selected.

For example, the behavior selection according to the comparison of each payoff value may be preset. For example, when the $U_M(M, Y)$ payoff value is larger than the $U_M(W, Y)$ payoff value and the $U_E(M, Y)$ payoff value is larger than the $U_E(M, NY)$ payoff value, an action strategy in which the target vehicle merges, and the host vehicle yields is selected. Here, $U_M$ is the payoff value of the target vehicle, and $U_E$ is the payoff value of the host vehicle.

As described above, the yield determiner may select the action strategy of the target vehicle and the host vehicle using the comparison result obtained by comparing each payoff value as shown in the table of FIG. 10. According to the corresponding selection strategy, the control signal generator may generate a control signal for controlling the behavior of the host vehicle.

Determining whether to yield using these payoff values is called a pure strategy. Pure strategy means choosing a balanced strategy that does not have an incentive to change one's strategy while considering the other's behavior based on the payoff matrix.

FIG. 11 is a view illustrating an operation of determining whether to yield based on probability according to a mixed strategy, according to an embodiment.

Referring to FIG. 11, the yield determiner may produce a probability for the host vehicle to yield and a probability for the target vehicle to merge using a preset probability calculation algorithm using a payoff value, and determine whether to yield based on the probability calculation result.

For example, the yield determiner calculates the yield probability q of the host vehicle under the assumption that the expected value when the target vehicle chooses to merge and the expected value when the merging vehicle chooses to wait are the same. Further, the yield determiner calculates the merging probability p of the target vehicle under the assumption that the expected value when the host vehicle chooses to yield and the expected value when the host vehicle chooses not to yield are the same.

The expected value when the target vehicle chooses to merge, the expected value when choosing to wait, the expected value when the host vehicle chooses to yield, and the expected value when the host vehicle chooses not to yield may be produced based on the payoff value in each case as shown in the table of FIG. 11.

The action strategies of the target vehicle and the host vehicle may be selected based on the probabilities of p and q calculated through this operation. In other words, the case where the probability is determined to be high may be selected as the action strategy of the target vehicle or the host vehicle.

This operation may be referred to as a mixed strategy, and when the pure strategy is not present, the probability of selecting each action with an expected payoff value is calculated, and compared to select an action strategy.

For example, when the payoff values between the comparison targets calculated by the pure strategy are the same, the action strategy according to the mixed strategy, instead of the pure strategy, may be produced. Alternatively, when it is determined that there is no pure strategy (the balanced state is not met) due to a preset specific context, the mixed strategy may be used.

Alternatively, the yield determiner may produce the action strategy through each case, but may determine whether the action strategy matches the actual context in the actual driving context and select and apply an action strategy determination method having a higher matching degree (pure strategy or mixed strategy).

Through the above-described operation, it is possible to perform high-safety vehicle control through determination and control on whether the host vehicle yields, when the target vehicle frequently merges from the pocket lane, such as a highway ramp section.

Hereinafter, from a method perspective, each operation performed by the above-described vehicle control device is described with reference to the drawings. Each step described below is exemplarily described to help understanding, and some or all of the above-described operations of FIGS. 1 to 11 may be performed by the following method. Further, each step may be combined or separated. Further, a specific step may be omitted or added if necessary to perform the above-described operations. Further, the order of each step may be changed if necessary.

FIG. 12 is a view illustrating a vehicle control method according to an embodiment.

Referring to FIG. 12, a vehicle control method may include selecting a target vehicle driving in the pocket lane by determining the presence of a pocket lane using precise map information S1210.

The selecting a target vehicle S1210 may determine whether there is a pocket lane in front of the host vehicle. Further, when there is a pocket lane, the selecting a target vehicle may select the presence or absence of a target vehicle and the target vehicle from among a plurality of vehicles.

For example, the selecting a target vehicle may determine whether there is a pocket lane using geometry information included in the precise map information. For example, the selecting a target vehicle may receive precise map information through a communication device in the host vehicle. The precise map information may include geometry information associated with lanes. For example, the geometry information may be provided in the form of a line connecting the center points of the lanes. Further, the precise map information may include information about the width of the lane. Accordingly, the selecting a target vehicle may identify the number of pieces of geometry information, and when the number of pieces of geometry information is changed, may determine whether there is a pocket lane in front using the change. Specifically, the selecting a target vehicle may calculate the number of pieces of geometry information in each section divided at regular intervals for the front lane in which the vehicle is to drive, and determine whether there is a pocket lane according to a change in the number of pieces of geometry information in each section.

Meanwhile, when it is determined that there is a pocket lane, the selecting a target vehicle may detect another vehicle driving in the pocket lane. When another vehicle is present in the pocket lane, the selecting a target vehicle may select the target vehicle based on the relative distance to the host vehicle. For example, the selecting a target vehicle may select one other vehicle relatively closest to the host vehicle as the target vehicle.

Further, the selecting a target vehicle may select the other vehicle having the highest probability as the target vehicle according to the probability calculated according to a preset algorithm using relative speed and relative distance information about the other vehicle. For example, the selecting a target vehicle may select a predetermined number of other vehicles having a close relative distance to the host vehicle, and select another vehicle having a high relative speed from among the other vehicles as the target vehicle. Further, the selecting a target vehicle may set the target vehicle using various preset algorithms.

The vehicle control method may include producing information about the target vehicle and distance information about the merging section S1220.

For example, the producing information about the target vehicle and distance information may produce relative speed information about the target vehicle and the host vehicle, speed information about the target vehicle, and location information about the target vehicle. Further, the producing information about the target vehicle and distance information may produce distance information about the merging section based on the location information about the target vehicle.

If the target vehicle is selected, the producing information about the target vehicle and distance information may be required to analyze information about the target vehicle and determine a merging section in which the target vehicle is most likely to merge according to the end of the pocket lane.

The pocket lane generally has a form in which the width of the lane gradually decreases for merging. Therefore, the target vehicle driving in the pocket lane should merge the driving lane before the pocket lane ends. Therefore, it is necessary to clearly set the merging section to determine whether the vehicle yields in the merging section and whether the target vehicle merges.

To that end, the producing information about the target vehicle and distance information needs to produce at least one of the speed of the target vehicle, the relative speed of the target vehicle, and location information about the target vehicle. Using this, the possibility of the target vehicle to merge in the merging section may be determined.

Meanwhile, the producing information about the target vehicle and distance information may select a tapering area in the pocket lane and produce the distance from the location of the target vehicle to the tapering area as the distance information about the merging section. The tapering area may be set as a section in which the lane width of the pocket lane decreases. The tapering area may be identified using the geometry information. For example, the tapering area may be defined as an area in which the relative distance between the geometry information about the driving lane and the geometry information about the pocket lane is reduced.

The vehicle control method may include determining whether to yield to the target vehicle using a payoff matrix produced based on information about the time required for the target vehicle to enter the driving lane on which the vehicle is driving and an acceleration variation of the host vehicle S1230.

For example, the required time information may be produced based on expected acceleration information and distance information about the target vehicle. The determining whether to yield may use the distance information about the merging section and the expected acceleration information about the target vehicle to produce the required time information that the target vehicle is expected to merge in the merging section.

Meanwhile, the determining whether to yield may determine whether to yield based on the payoff matrix and game theory.

For example, the determining whether to yield may use game theory-based modeling and a pay-off matrix calculation considering the interaction between the host vehicle and the target vehicle.

The determining whether to yield may determine whether to yield using a preset Nash equilibrium-based behavior determination algorithm using the payoff matrix.

The payoff matrix may be calculated with respect to the host vehicle and the target vehicle, and the determining whether to yield may produce the payoff matrix based on a target utility function preset to receive a higher payoff as the required time decreases and a host vehicle utility function preset to receive a higher payoff as the acceleration variation of the host vehicle decreases. In other words, the determining whether to yield may produce each payoff value of the payoff matrix based on the target utility function and the host vehicle utility function.

To that end, the determining whether to yield may determine a payoff value (e.g., a payoff value) based on the preset target utility function and the preset host vehicle utility function, separately for a case in which the target vehicle waits or merges when the host vehicle yields and a case in which the target vehicle waits or merges when the host vehicle does not yield, and produce the payoff matrix as the payoff value.

When the payoff matrix is produced, the determining whether to yield may determine whether the host vehicle yields using the game theory.

For example, when the payoff matrix is produced, the determining whether to yield may determine whether the host vehicle yields and whether the target vehicle merges, based on a comparison result between the payoff values of the payoff matrix. For example, the determining whether to yield may determine whether to yield using a pure strategy game theory that selects a strategy in a balanced state without an incentive to change the strategy of the vehicle while considering the behavior of the target vehicle based on the payoff matrix.

As another example, the determining whether to yield may produce a probability for the host vehicle to yield and a probability for the target vehicle to merge using a preset probability calculation algorithm using the payoff value. The determining whether to yield may determine whether to yield using each calculated probability value. For example, the determining whether to yield may calculate the probability of selecting each action as the expected value of the payoff matrix and then compare the same to determine whether to yield using a mixed strategy game theory of selecting a strategy.

As another example, the determining whether to yield may determine whether to yield by preferentially using the pure strategy, but may determine whether to yield using the mixed strategy when the pure strategy is not present.

The determining whether to yield may determine whether the target vehicle merges or waits through the above-described operation, and may determine whether the host vehicle yields accordingly.

The vehicle control method may include generating a control signal for controlling the behavior of the host vehicle based on a result of determining whether to yield S1240.

For example, the generating a control signal may produce a deceleration value determined according to whether the target vehicle merges and whether the host vehicle yields. The generating a control signal may generate and transmit a control signal to an acceleration part or a deceleration part of the vehicle to control the behavior of the vehicle with the produced deceleration value.

For example, the generating a control signal may generate a control signal for setting the deceleration amount of the host vehicle to a comfort deceleration amount that slowly increases the deceleration amount of the host vehicle in advance when the host vehicle yields and the target vehicle merges. Alternatively, the generating a control signal may generate a control signal for setting the deceleration amount of the host vehicle to the deceleration amount corresponding to the cut-in vehicle when the target vehicle merges without yielding by the host vehicle. Alternatively, the generating a control signal may generate a control signal for setting the deceleration amount of the host vehicle to a comfort deceleration amount that slowly increases the deceleration amount of the host vehicle in advance when the host vehicle yields and the target vehicle waits. Alternatively, the generating a control signal may set the deceleration amount of the host vehicle to 0 when the host vehicle does not yield, and the target vehicle waits to generate a control signal so that the current acceleration of the host vehicle is maintained.

As described above, according to the disclosure, it is possible to select the presence of a precise pocket lane and a target vehicle in front of a vehicle driving. Further, according to the disclosure, it is possible to predict whether the target vehicle present in the pocket lane merges and determine whether the host vehicle yields accordingly, using a payoff matrix and a game theory. The so determined behavior of the host vehicle and the target vehicle may be used to set a deceleration force or acceleration force for controlling the behavior of the host vehicle.

Accordingly, it is possible to automatically determine the intention to control the behavior of the vehicle more accurately, and to stably control the behavior of the host vehicle, thus enhancing stability.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A vehicle control device, comprising:
a processor configured to:
determine a presence of a pocket lane using precise map information, and select a target vehicle driving in the pocket lane;
produce information about the target vehicle and distance information about a merging section;
determine whether to yield to the target vehicle using a payoff matrix produced based on an acceleration variation of a host vehicle and information about a time required for the target vehicle to enter a driving lane where the host vehicle is driving; and
generate a control signal for controlling a behavior of the host vehicle based on a result of determining whether to yield.

2. The vehicle control device of claim 1, wherein the processor is further configured to:
determine whether the pocket lane is present by producing number change information about geometry information included in the precise map information; and
select, as the target vehicle, a vehicle having a shortest relative distance from the host vehicle when the pocket lane is present.

3. The vehicle control device of claim 1, wherein the processor is further configured to:
produce relative speed information about the target vehicle and the host vehicle, speed information about the target vehicle, and location information about the target vehicle; and
produce distance information about the merging section based on the location information about the target vehicle.

4. The vehicle control device of claim 3, wherein the processor is further configured to:

select a tapering area from the pocket lane; and produce a distance from the location information about the target vehicle to the tapering area as the distance information about the merging section.

5. The vehicle control device of claim 1, wherein the required time information is produced based on expected acceleration information about the target vehicle and the distance information.

6. The vehicle control device of claim 1, wherein the processor is further configured to determine whether to yield based on a Nash equilibrium-based behavior determination algorithm preset using the payoff matrix.

7. The vehicle control device of claim 1, wherein the payoff matrix is produced based on a target utility function preset to receive a higher payoff as the required time decreases and a host vehicle utility function preset to receive a higher payoff as the acceleration variation of the host vehicle decreases.

8. The vehicle control device of claim 7, wherein the processor is further configured to:

determine a payoff value based on the preset target utility function and the preset host vehicle utility function, separately for a case where the target vehicle waits or merges when the host vehicle yields, and a case where the target vehicle waits or merges when the host vehicle does not yield; and produce the payoff matrix with the payoff value.

9. The vehicle control device of claim 8, wherein the processor is further configured to determine whether to yield based on a result of comparison between payoff values.

10. The vehicle control device of claim 8, wherein the processor is further configured to:

calculate a probability of whether the host vehicle yields and a probability of whether the target vehicle merges using a probability calculation algorithm preset using the payoff value; and determine whether to yield based on a result of the probability calculation.

11. A vehicle control method, comprising:

selecting a target vehicle driving in a pocket lane by determining a presence of the pocket lane using precise map information;

producing information about the target vehicle and distance information about a merging section;

determining whether to yield to the target vehicle using a payoff matrix produced based on an acceleration variation of a host vehicle and information about a time required for the target vehicle to enter a driving lane where the host vehicle is driving; and generating a control signal for controlling a behavior of the host vehicle based on a result of determining whether to yield.

12. The vehicle control method of claim 11, wherein the selecting a target vehicle determines whether the pocket lane is present by producing number change information about geometry information included in the precise map information, and selects, as the target vehicle, a vehicle having a shortest relative distance from the host vehicle when the pocket lane is present.

13. The vehicle control method of claim 11, wherein the producing information about the target vehicle and distance information produces relative speed information about the target vehicle and the host vehicle, speed information about the target vehicle, and location information about the target vehicle, and produces distance information about the merging section based on the location information about the target vehicle.

14. The vehicle control method of claim 13, wherein the producing information about the target vehicle and distance information selects a tapering area from the pocket lane and produces a distance from the location information about the target vehicle to the tapering area as the distance information about the merging section.

15. The vehicle control method of claim 11, wherein the required time information is produced based on expected acceleration information about the target vehicle and the distance information.

16. The vehicle control method of claim 11, wherein the determining whether to yield determines whether to yield based on a Nash equilibrium-based behavior determination algorithm preset using the payoff matrix.

17. The vehicle control method of claim 11, wherein the payoff matrix is produced based on a target utility function preset to receive a higher payoff as the required time decreases and a host vehicle utility function preset to receive a higher payoff as the acceleration variation of the host vehicle decreases.

18. The vehicle control method of claim 17, wherein the determining whether to yield determines a payoff value based on the preset target utility function and the preset host vehicle utility function, separately for a case where the target vehicle waits or merges when the host vehicle yields, and a case where the target vehicle waits or merges when the host vehicle does not yield, and produces the payoff matrix with the payoff value.

19. The vehicle control method of claim 18, wherein the determining whether to yield determines whether to yield based on a result of comparison between payoff values.

20. The vehicle control method of claim 18, wherein the determining whether to yield calculates a probability of whether the host vehicle yields and a probability of whether the target vehicle merges using a probability calculation algorithm preset using the payoff value, and determines whether to yield based on a result of the probability calculation.

* * * * *